United States Patent
Wolfanger (10) Patent No.: US 11,933,548 B2
(45) Date of Patent: Mar. 19, 2024

(54) COOLER

(71) Applicant: HYDAC COOLING GMBH, Sulzbach/Saar (DE)

(72) Inventor: Thomas Wolfanger, Neunkirchen (DE)

(73) Assignee: HYDAC COOLING GMBH, Saarbruecken-Dudweiler (DE)

( * ) Notice: Subject to any disclaimer, the term of this patent is extended or adjusted under 35 U.S.C. 154(b) by 453 days.

(21) Appl. No.: 17/295,536

(22) PCT Filed: Jan. 27, 2020

(86) PCT No.: PCT/EP2020/051906
§ 371 (c)(1),
(2) Date: May 20, 2021

(87) PCT Pub. No.: WO2020/156995
PCT Pub. Date: Aug. 6, 2020

(65) Prior Publication Data
US 2022/0018612 A1    Jan. 20, 2022

(30) Foreign Application Priority Data
Jan. 31, 2019 (DE) .................... 10 2019 000 723.9

(51) Int. Cl.
*F28F 1/12* (2006.01)
*F28F 3/02* (2006.01)
*F28F 3/08* (2006.01)

(52) U.S. Cl.
CPC .............. *F28F 1/128* (2013.01); *F28F 3/027* (2013.01); *F28F 3/086* (2013.01); *F28F 2215/08* (2013.01)

(58) Field of Classification Search
CPC .. F28F 1/128; F28F 3/027; F28F 3/086; F28F 2215/08
(Continued)

(56) References Cited

U.S. PATENT DOCUMENTS

| 6,729,388 B2 * | 5/2004 | Emrich ............... F28D 1/05366 165/181 |
| 7,073,570 B2 * | 7/2006 | Yu ........................... F28F 3/044 165/177 |

(Continued)

FOREIGN PATENT DOCUMENTS

| DE | 2 163 951 | 8/1972 |
| DE | 20 2011 000 831 | 8/2011 |

(Continued)

OTHER PUBLICATIONS

International Search Report (ISR) dated Mar. 30, 2020 in International (PCT) Application No. PCT/EP2020/051906.

*Primary Examiner* — Claire E Rojohn, III
(74) *Attorney, Agent, or Firm* — WENDEROTH, LIND & PONACK, L.L.P.

(57) ABSTRACT

A cooler has individual cooling elements (1) of stacked construction having ducts (25) extending in parallel to one another, Each duct delimits a flow chamber (29) for the throughflow of a liquid medium to be cooled. Between each pair of ducts. at least two layers (3, 5) of individual rows of meandering fins (34) extend for the throughflow of air and jointly delimit a further flow chamber (26, 28) each. The respective one flow chamber (29), free of obstacles, permits a laminar flow of the liquid medium through the assignable duct (25) in one throughflow direction. The height (H1) of each fin (34), viewed transversely to the direction of throughflow of the liquid medium, has at least the same height as the free throughflow cross section of the flow chamber (29) of the adjacently arranged duct (25), viewed in parallel to the extension of the respective fin (34). In every layer (3, 5), a plurality of rows (36) of several fins (34) are arranged in succession, which each viewed in the direction of throughflow of the duct (25) are offset from each other.

20 Claims, 4 Drawing Sheets

(58) Field of Classification Search
USPC .......................................................... 165/172
See application file for complete search history.

(56) References Cited

U.S. PATENT DOCUMENTS

| | | | |
|---|---|---|---|
| 7,878,233 B2* | 2/2011 | Bates | F28F 9/0224 |
| | | | 165/41 |
| 8,656,988 B1* | 2/2014 | Paul | F28D 1/05366 |
| | | | 165/906 |
| 9,243,851 B2* | 1/2016 | Viswanathan | F28F 13/12 |
| 9,664,450 B2* | 5/2017 | Kinder | F28D 7/1684 |
| 9,671,169 B2* | 6/2017 | Riondet | F28F 1/06 |
| 2005/0126767 A1 | 6/2005 | Wolk | |
| 2009/0020260 A1* | 1/2009 | Miyagawa | F28D 15/0266 |
| | | | 165/181 |
| 2009/0266104 A1* | 10/2009 | Ichiyanagi | F28F 9/0253 |
| | | | 165/173 |
| 2012/0024510 A1 | 2/2012 | Kohl et al. | |
| 2013/0068438 A1 | 3/2013 | Matsumoto et al. | |

FOREIGN PATENT DOCUMENTS

| | | |
|---|---|---|
| DE | 10 2011 107 013 | 1/2013 |
| DE | 10 2012 017 462 | 5/2014 |
| DE | 10 2014 001 703 | 8/2015 |
| WO | 03/076860 | 9/2003 |

* cited by examiner

COOLER

FIELD OF THE INVENTION

The invention relates to a cooler, having individual cooling elements of stacked construction having ducts extending in parallel to one another, each of which delimits a flow chamber for the throughflow of a liquid medium to be cooled. Between each duct at least two layers of individual rows of meandering fins extend, which fins being for the flow of air jointly delimit a further flow chamber each.

BACKGROUND OF THE INVENTION

Coolers of this type, which operate as liquid-air heat exchangers, are state of the art, see for instance DE 10 2014 001 703 A1. To achieve the cooling capacities required for the individual applications, air-liquid coolers are usually operated as active coolers having cooling fans that generate the air flow required for an effective heat exchange in the flow chambers. To avoid the setup and energy costs associated with the use of fans, it is known, see DE 10 2011 107 013 A1, in coolers, intended for the dissipation of the heat to the environment, to utilize the wind flow flowing around the nacelle or tower of wind turbines for the generation of the cooling air. As shown in that document, in an effort to achieve a sufficiently high flow velocity in the flow chambers, the respective heat exchanger is located on the wind turbine at a point where the air flow is accelerated by the displacement effect resulting from the geometry of the wind turbine.

This solution is suboptimal in that the constraint of arranging the heat exchanger in a specific place interferes with the free design of the geometry of the nacelle and/or tower. Also, there is room for improvement in the effectiveness of heat exchange despite the special position arrangement of the cooler, so that an additional fan may be required as an active flow booster.

DE 21 63 951 B2 describes a generic heat exchanger having a perturber, arranged in the interior of a tube through which fluid flows. The perturber has a thin metal strip having projecting lugs arranged in rows and bent from openings. The bent ends of the lugs rest against the inner wall of the tube, wherein the lugs are provided with one window each, and wherein transversely arranged recesses are additionally provided in the metal strip between the openings. This structure is to cause increased vorticity of the fluid medium and consequently safeguard a good heat transfer. However, because of the introduced inhibition of the mentioned perturber, pressure losses occur in any case, even if they are described as small, and there is a longer residence time of the fluid to be cooled in the heat exchanger, which reduces the throughput of fluid to be cooled and degrades the overall energy balance of the heat exchanger.

From WO 03/076860 A1 a further cooler in the form of a heat exchanger is known, in particular for motor vehicles, having flat tubes through which a first fluid can flow internally. To the flat tubes a second fluid can be applied externally, wherein the flat tubes are arranged essentially transversely to the direction of flow of the second fluid and in parallel to one another and are spaced apart from one another, thereby forming flow paths for the second fluid passing through the heat exchanger. Cooling fins are arranged in the flow paths, each extending between adjacent flat tubes, wherein a plurality of corrugated fins are provided as cooling fins, which are arranged in succession in the flow direction of the second fluid and are laterally offset with respect to one another. The flat tubes are provided with flow guide elements for flow guidance, and their ends are connected to manifolds or collector pipes in a fluid-conveying manner. The corrugated fins each form individual fins, forming only one layer of a row of meandering fins, which are arranged in succession and offset from one another, viewed transversely to the direction of flow through the flat tubes. The fins have gill-shaped slots in the fin walls for improved heat transfer of the second fluid to be conveyed, which also contributes to increasing the stability of the heat exchanger.

SUMMARY OF THE INVENTION

Based on this prior art, the invention addresses the problem of providing a cooler of the genus mentioned at the outset, which has a high efficiency, is inherently stable and is inexpensive to implement.

According to the invention, this problem is basically solved by a cooler having the respective one flow chamber, free from obstacles, permitting a laminar flow of the liquid medium through the assignable duct in one throughflow direction. A high throughput of liquid medium to be cooled is achieved, resulting in an energetically favorable operation having a high cooling capacity.

In that, furthermore, the height of every fin, viewed transversely to the direction of throughflow of the liquid medium, has at least the same height as the free throughflow cross-section of the flow chamber of the adjacently arranged duct, viewed in parallel to the extension of the respective fin, and in that in every layer a plurality of rows of several fins arranged in succession, which each viewed in the direction of throughflow of the duct are offset from each other. A very high air throughput compared to single-layer systems is achieved because of the stacked layers, arranged directly on top of each other, of the respective cooling element, resulting in a high efficiency, such that the cooler according to the invention can be used as a passive heat exchanger utilizing the surrounding air flow with particular advantage in wind turbines, for instance according to DE 10 2012 017 462 A1. Without weakening the wall by adding cooling guide elements, such as gill-shaped slots, this results in a trouble-free flow guidance at a high-level heat exchange, which can also be implemented in a particularly inherently stable and cost-effective manner.

The fins, against which air flows, of successive tiers of stacked flow chambers are each in thermal contact with an assigned cooling medium duct. This structure allows for a substantially increased heat dissipation from the liquid medium to be cooled, so that the cooler according to the invention is characterized by a high cooling capacity even at limited flow velocities of the cooling air and can be used with particular advantage and at a mounting area, that can be freely selected, on wind turbines. Fins having a correspondingly high bar height permit a high throughput of cooling air at correspondingly high-level heat transfer rates between the fins of the cooler and the cooling air.

In a preferred exemplary embodiment, it is provided that at least part of the fins of every layer adjoining each other extends in a bar-shaped manner each, forming a waveform between two respective opposite deflection points, and that deflection points of two adjacent layers are congruently facing each other in a joint plane adjoining the adjacently arranged ducts of a cooling element.

Fin components that are congruent with each other, viewed in a vertical plane for an upright cooler, permit a simplified manufacture because sheet metal parts having the same shape can always be used for the overall cooler. The material may be a sheet material, preferably made of an aluminum material having good thermal conductivity. In an advantageous embodiment of the cooler according to the invention, it is provided that in the respective plane a partition wall extends in parallel to the flow direction of the liquid medium in the ducts. The partition walls, each arranged horizontally when the cooler is in operation, increase the stability of the layers of fins within the overall arrangement and at the same time augment the heat transfer.

Advantageously, the respective partition wall has the same material thickness as the fins forming the waveform. The use of uniform sheet wall thicknesses simplifies production and reduces costs.

Advantageously, the bar height of a single bar-shaped fin is preferably three to six times, and particularly preferably five times, the height of the flow chamber for a duct conveying the liquid to be cooled. A multiple of the bar height also means obtaining a multiple of the air-cooled surface of the fins in relation to the volume of the medium to be cooled in the respective medium-conveying duct. In this way, a high throughput of cooling air and a large heat transfer per individual cooling element are achieved, wherein the individual cooling elements make up the cooler in stacked construction. In this respect, an optimum of the quantity ratio between the medium to be cooled and the cooling medium (air) is achieved.

Advantageously, the flow chamber of every duct has a free opening cross-section, which is exclusively rectangularly delimited by peripheral duct walls whose material thickness preferably matches the wall thickness of the respective fin.

It is also advantageous to select the offset in such a way that the respective fin of a further row of fins, arranged between two to each other parallel, offset-free rows of fins, extends offset from the adjacent fins of the two adjacent rows of fins by a predeterminable axial distance, in parallel to the respective duct, viewed in its flow direction. The offset creates a kind of air divider for the cooling air having improved, homogenized flow guidance, resulting in a particularly effective heat transfer. The offset of the fins can also be seen in front view on the cooler, in which the offset row projects or is offset back by the aforementioned axial spacing in relation to the adjacent rows, as viewed in the direction of the fluid flow.

Advantageously, the arrangement can be such that the offset is 3 mm to 8 mm, preferably 4 mm to 6 mm, particularly preferably between 5 mm to 5.9 mm. Preferably, for fins having a greater height or length between the adjacent respective ducts, the offset should also have higher values.

In advantageous exemplary embodiments, the height of a single fin, viewed transversely to the direction of flow through a duct, is between 5 mm to 15 mm, preferably 12 mm, wherein the total depth of the cooler having a plurality of rows of fins arranged in succession in a horizontal plane is 60 mm to 90 mm, preferably 63 mm to 82 mm, in depth.

In particularly preferred exemplary embodiments, the thickness or wall thickness of the fins, formed from a sheet material, is 0.15 mm to 0.4 mm, preferably 0.2 mm, and the thickness of a panel, being of sheet material, as a partition wall between the rows of fins is 0.2 mm to 0.8 mm, preferably 0.4 mm. It is advantageous to use aluminum as the sheet material for both the fins and the respective duct.

In particularly advantageous exemplary embodiments, the meander shape of the respective fin row has fins, extending in parallel to one another, and two adjacent fins of the fin rows are each integrally interconnected by the deflection points and the connecting bars, respectively, which connecting bars extend in parallel to the ducts having boundary walls in their direction of flow. Because of the parallel orientation of the connecting bars on the deflection points, they are in full contact with the boundary walls of the ducts, so that extensive contact surfaces are formed for conducting heat from the fins to the relevant duct. These deflection points of the meandering fins compensate thermal stresses occurring during operation because of thermally induced expansion.

In a preferred embodiment of the cooler, the rows of fins and the ducts extend between two media-conveying main struts forming the fluid connections with the ducts and span a rectangular front face as the cooler surface, wherein 20 to 48, preferably 25 to 63, particularly preferably 54 ducts form the effective cooler surface. The large number of ducts permits a favorable ratio of duct surface area to the volume of the medium to be cooled and a particularly effective cooling, in particular in conjunction with the remaining geometric design of the cooler.

A further subject matter of the invention according to the invention is a wind turbine, in which at least one cooler according to the invention is spatially assigned to a nacelle of the turbine for the purpose of flow through the flow chambers without any fan drive only based on the blade air flow and/or purely wind-driven ambient air. The cooler according to the invention enables a substantially increased heat dissipation from the liquid medium to be cooled, such that it is characterized by a high cooling capacity, even for limited flow velocities of the cooling air, and can then be used with particular advantage and at a mounting area, that can be freely selected, on wind turbines.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
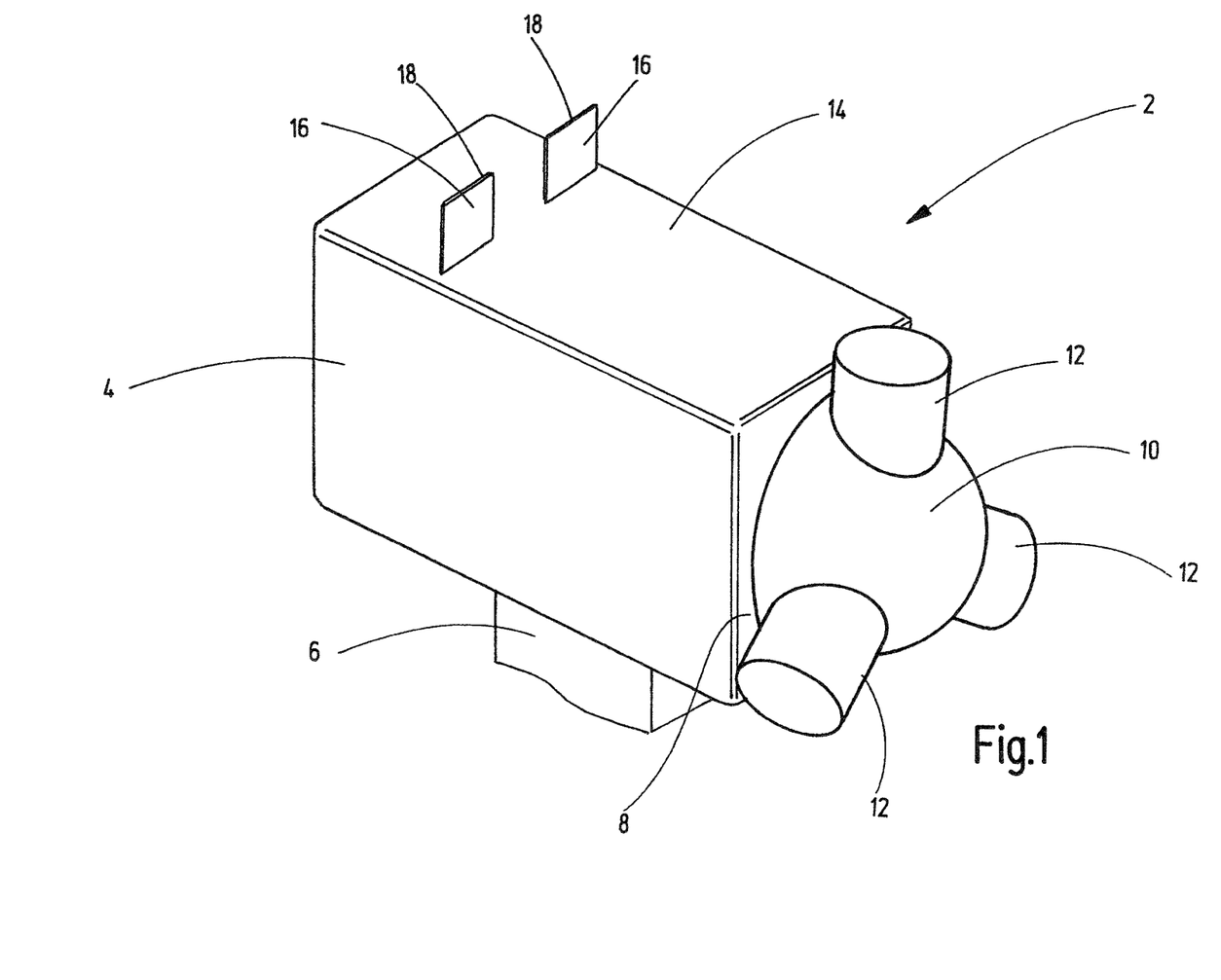
FIG. 1 is a highly schematically simplified and cut off perspective view of an end region, adjacent to a nacelle of a wind turbine provided with two coolers according to an exemplary embodiment of the invention.

FIG. 1 shows only the nacelle 4 of a wind turbine 2 in a highly simplified form, wherein the nacelle 4 is rotatably arranged on a tower 6 only suggestively or partially shown. Only a hub 10 together with blade roots 12 of rotor blades, otherwise not shown, of a rotor, located at the front 8 of nacelle 4, are shown. Two coolers 18, according to the exemplary embodiment of the invention, are arranged adjacent to each other on the upper side 14 of the nacelle 4 in such a way that their front faces 16 are exposed in the direction of the wind flow flowing along the nacelle surface 14. Further details of the cooler 18 are illustrated in FIGS. 2 to 9.

Figure 2:
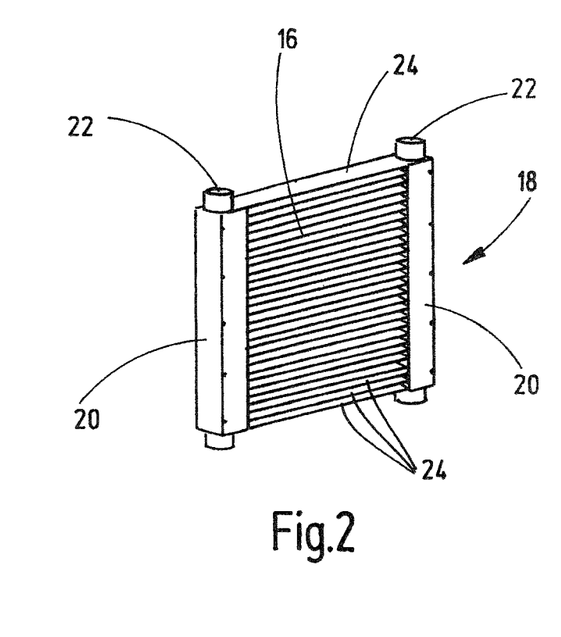
FIG. 2 is a perspective view of the exemplary embodiment of the cooler according to the invention.
Figures 3, 4:
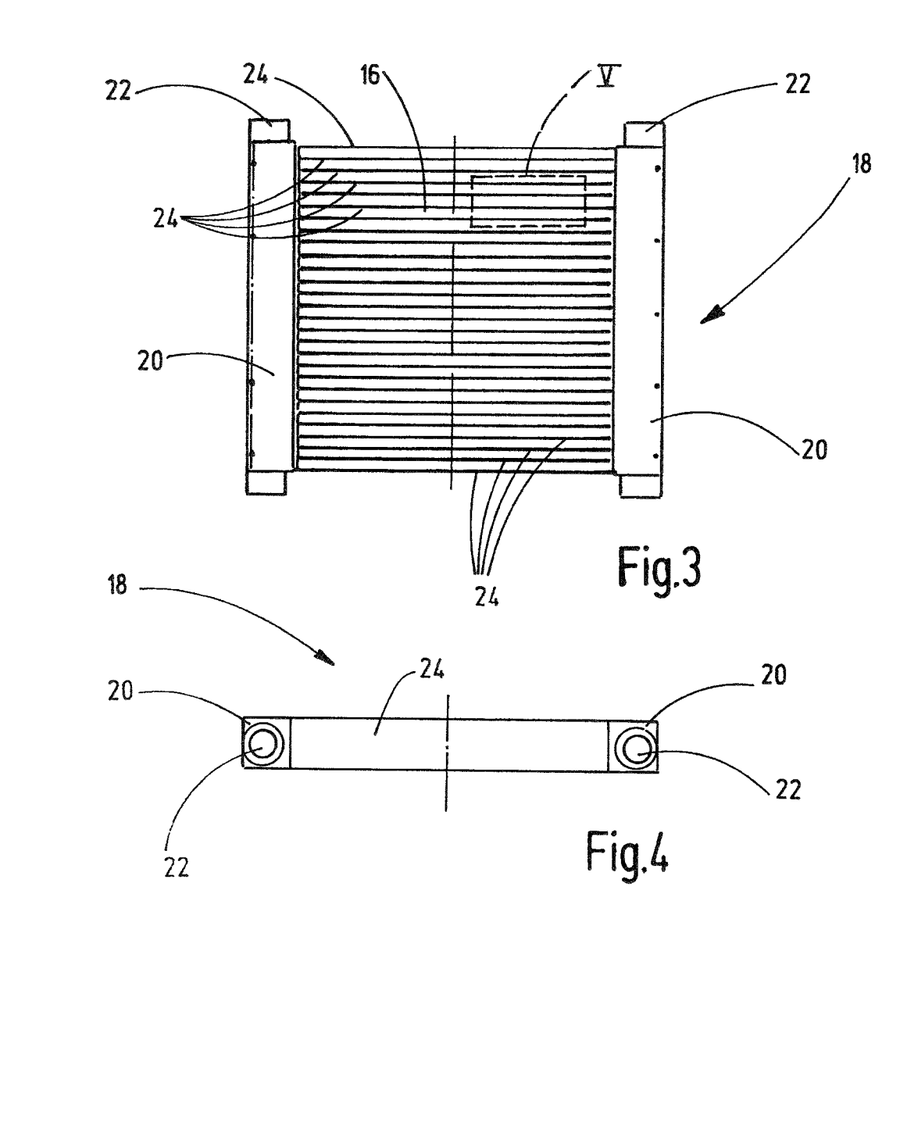
FIGS. 3 and 4 are a front view and a top view, respectively, of the exemplary embodiment of the cooler.
Figure 5:
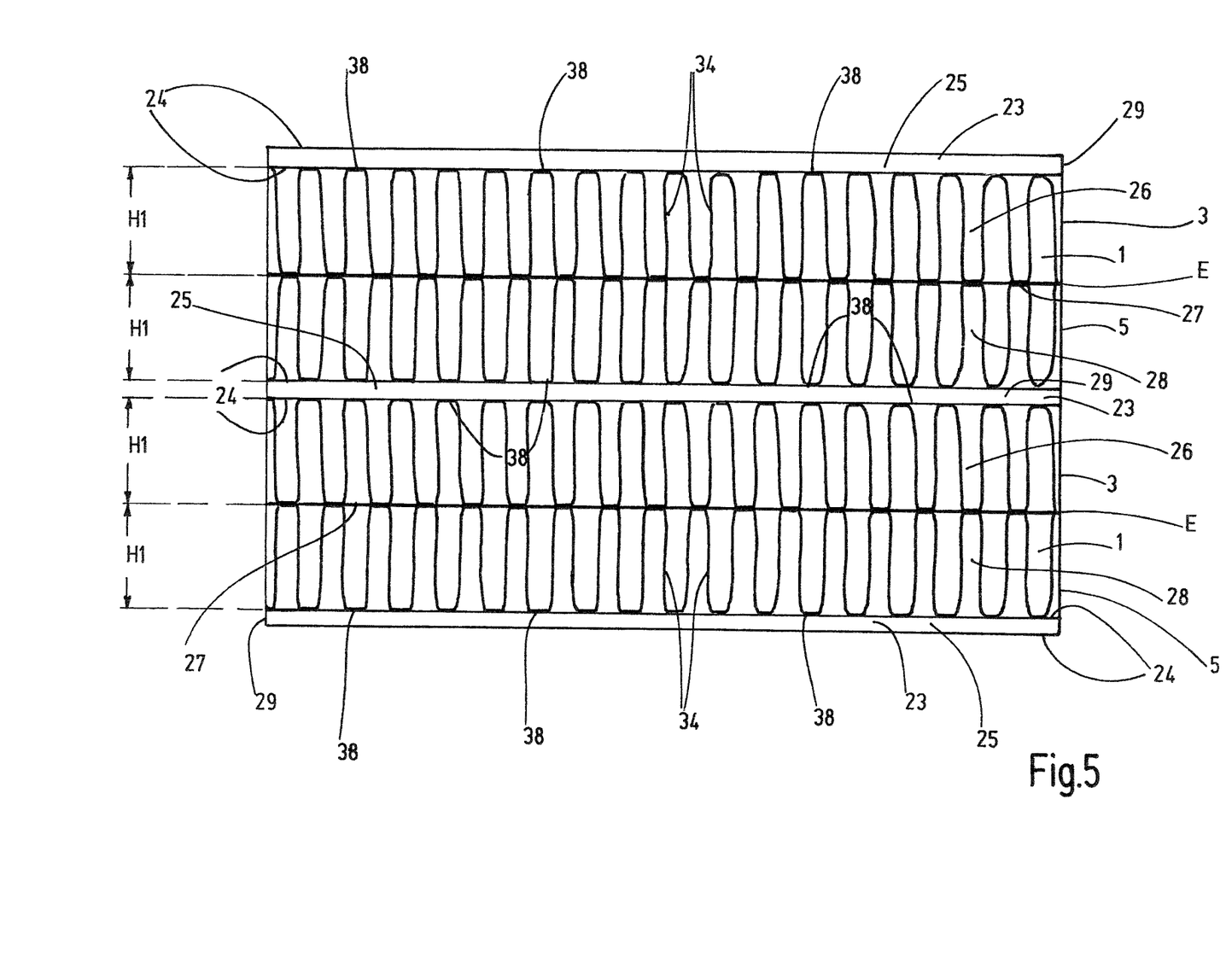
FIG. 5 is a front view, drawn at approximately twice the magnification of a practical embodiment, of the partial area, designated by V in FIG. 3, of the exemplary embodiment.

As shown in FIGS. 2 and 3, the front face 16, exposed to the wind flow, of the cooler 18 is square in outline. On both sides, main struts 20, forming a support structure, adjoin the front face 16. Each of the main struts 20 is a bar-shaped hollow box having an arbitrarily shaped cross-section, which in the exemplary embodiment shown is square. Each main strut 20 forms a collecting chamber for the liquid medium to be cooled. This medium can be a water-glycol mixture that is heated by the lost heat generated in the operation of the wind turbine, wherein the lost heat is to be dissipated to the ambient air. Ports 22 for the inflow and outflow of the medium are arranged on the struts 20, which form a medium passage to the interior of the respective collecting chamber. While FIGS. 2 to 4 show the ports at the upper ends of the struts 20, it goes without saying that the ports 22 are conveniently provided on the underside, facing the nacelle top 14, if the coolers 18 are attached to the top 14 of the nacelle 4.

In the exemplary embodiment shown in the drawing, the lateral length of the square outline and thus the depth of the radiator measured perpendicular to the plane of the end face 16 is 63 mm. The height of the struts 20 measured in the drawing plane of FIG. 3 and the spacing of the struts 20 are such that the front face 16 spans a rectangular front face 16, exposed to the ambient wind, as a cooler surface. Boundary walls 24 extend between the struts 20, only part of which boundary walls are numbered in FIGS. 2 and 3 and which are formed from thin, flat-surfaced aluminum plates, whose width matches the lateral length of the square outline of the struts 20, see FIG. 4. The boundary walls 24 are, see FIGS. 5 and 9, each combined into groups of two, in which the walls 24 extend equidistantly from each other and in parallel and, with a front wall 23 and a rear wall 23' in between them, form a duct 25 for the medium to be cooled, in particular in the form of a liquid. The groups of two of the boundary walls 24, extending equidistantly from each other and in parallel, each delimit between them a combination of two flow chambers 26 and 28, separated by a further panel used as a partition wall 27. Through flow chambers 26 and 28 the ambient air can flow from the front face 16 forming the cooling surface. The ends of the ducts 25, formed between the boundary walls 24, are each connected to the collecting chamber inside the struts 20 in a fluid conveying manner. In operation, the liquid medium to be cooled flows therethrough. In this example, the width of the ducts 25, measured transversely to the longitudinal direction of the duct, is 3 mm each.

The cooler 18 shown in the figures is formed of individual cooling elements 1 in a stacked structure with the ducts 25 extending in parallel to each other. In any case, any single cooling element 1 has a combination of two layers 3, 5 of meandering fins 34, wherein the two layers 3, 5 of a cooling element 1 are separated by the partition wall 27, which extends in a horizontal plane E.

Figure 9:
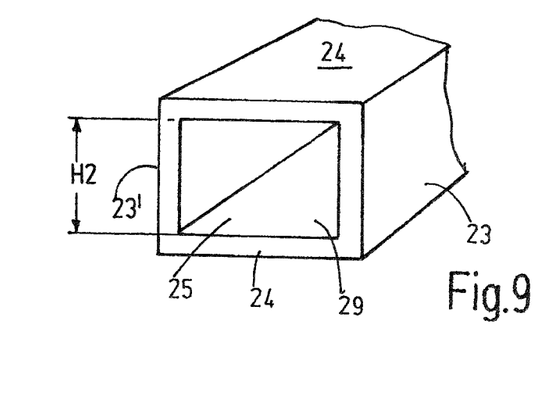
FIG. 9 is a perspective front view on a part of a duct, not connected to a main strut, for the medium to be cooled, wherein the wall thicknesses are shown larger for better illustration, of the exemplary embodiment.

As shown in particular in FIG. 9, each individual duct 25 of rectangular, in particular square, cross-section is delimited by the walls 24 at the top and at the bottom and by a front wall 23 and a rear wall 23'. In this respect, the duct 25 mentioned spans a kind of flow chamber 29, which, kept free of obstacles, permits a laminar flow of the liquid medium to be cooled through the duct 25 in a flow direction.

The vertical height H1 of every fin 34, viewed transversely to the flow direction of the liquid medium, has at least the same height H2 as the free flow cross-section of the flow chamber 29 of the adjacently arranged duct 25, viewed in parallel to the extension of the respective fin 34 in its height wise orientation. In every layer 3, 5, there is in turn a plurality of rows 36 of a plurality of fins 34, which are arranged in succession in the horizontal direction (see FIGS. 7 and 8), and each has an offset P (see FIG. 6) from one another, viewed in the direction of flow through the duct 25. This axial offset P of the rows 36 arranged in succession is viewed in the horizontal direction towards the front face of the cooler 18.

As can be taken from FIGS. 5 to 9, for transferring the heat of the liquid medium flowing through the ducts 25 to the air flowing through the flow chambers 26 and 28, fins 34, whose surfaces are flowed against by the cooling air flowing therethrough, are located in the flow chambers 26, 28. As is most clearly shown in FIGS. 7 and 8, the fins 34, which are only partially numbered in the figures, are arranged in the fin rows 36, wherein the rows 36 extend in a direction in parallel to the plane of the front face 16 and the rows 36 are arranged in succession viewed in the direction of flow. The identically formed fins 34 are each formed by sheet metal parts made of aluminum sheet having a rectangular outline, wherein the sheet thickness in this exemplary embodiment is 0.2 mm. The fins 34 extend in a direction in parallel to the direction of the air flow and perpendicular to the longitudinal direction of the ducts 25 and have a height H1, which matches the height of the assigned flow chamber 26 or 28. In this example, the height of the flow chambers 26 and 28 and accordingly the height H1 of the fins 34 is 10.3 mm. At the ends adjacent to the boundary walls 24, the fins 34 are interconnected by connecting bars (also not all numbered in the figures), forming deflection points 38 and continuing in one piece the sheet material. The connecting bars lie against the facing boundary wall 24 in a planar manner and are secured thereto by bonding or welding. Owing to the planar contact of the deflection points 38, every fin 34 is in close heat-conducting contact with a duct 25. This connection also applies to the articulation of the fins 34 to the panel spanning a partition wall 27, where the panel extends in the horizontal direction.

Figure 6:
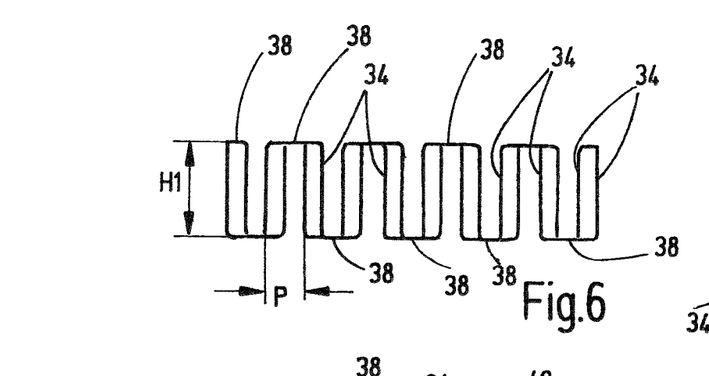
FIG. 6 is a front view of a section of two rows of fins succeeding each other in the direction of air flow of the exemplary embodiment.
Figure 7:
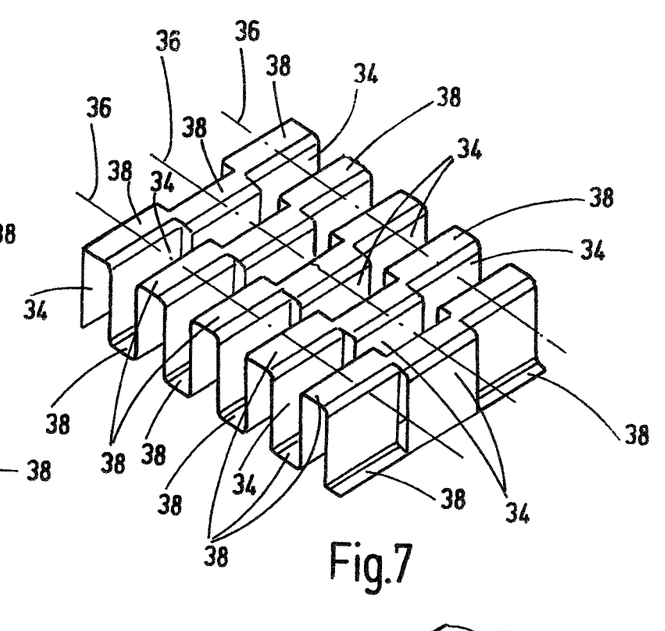
FIGS. 7 and 8 are a perspective view and top view, respectively, of three rows of fins succeeding each other in the direction of air flow of the exemplary embodiment.
Figure 8:
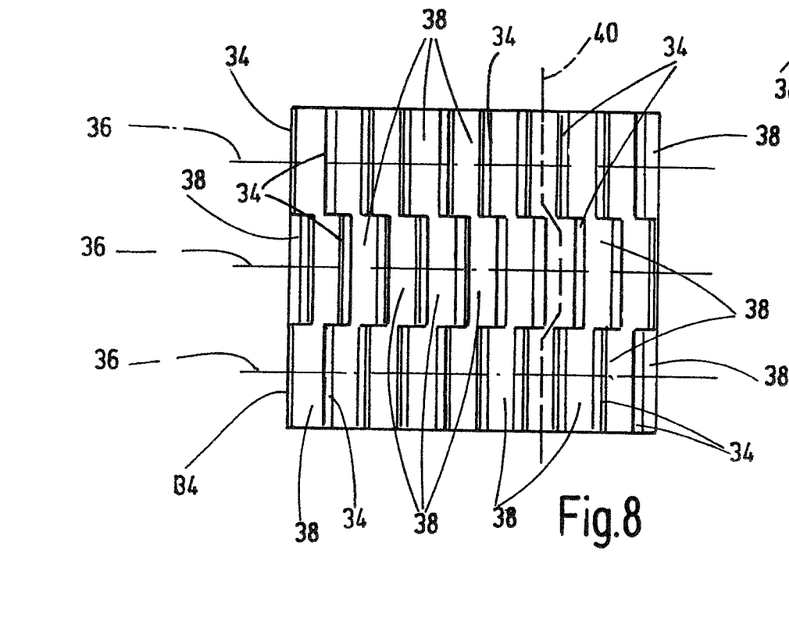

As shown in FIGS. 7 and 8, the rows 36 of fins 34 with the flow chambers 26 are arranged in succession without distance in the direction of the air flow, wherein successive rows 36 each are displaced alternately to one side and the other side in the longitudinal direction of the ducts 25 by half the width of the connecting bars or deflection points 38 and thus, as viewed in their direction of flow, axially. As indicated by the dashed line 40 in FIG. 8, the flow division forms zigzag flow paths for the air flow through the flow chambers 26. The width of the fins 34, measured in the direction of flow, or their depth in this example matches the height H1 of the fins 34, wherein the number of fin rows 36, measured in the direction of flow, is selected such that the depth of this exemplary embodiment of the cooler is 63 mm. The width of the connecting bars 38, measured in the longitudinal direction of the ducts 29, is selected such that the offset of the fins 34, denoted by P in FIG. 6, is 5 mm in this exemplary embodiment.

The arrangement of the fin rows 36, provided in the invention, and their geometric form having contact surfaces, formed via the connecting bars 38, as deflection points on the boundary walls 24 permits a particularly effective heat coupling for heat transfer from the heated medium in the ducts 25 to the fins 34, The fins 34 have large surfaces against which air flows. In addition, because the fin rows 36 of each flow chamber exchange heat with both air-conveying ducts 26 and ducts 28, the coolers according to the invention provide a cooling capacity, which renders the use of the coolers 18 for the dissipation of the heat loss occurring during operation without supporting, motor-driven auxiliary fans possible, while the mounting area on the nacelle 4 of a wind turbine can be freely selected. This is without parallel in the prior art.

While one embodiment has been chosen to illustrate the invention, it will be understood by those skilled in the art that various changes and modifications can be made therein without departing from the scope of the invention as defined in the claims.

The invention claimed is:

1. A cooler, comprising:
   individual cooling elements of stacked construction having ducts extending in parallel to one another, each of the ducts delimiting a flow chamber being capable of a first throughflow of a liquid medium to be cooled and being free of obstacles permitting a laminar flow of the liquid medium through each of the ducts in a liquid throughflow direction, each of the flow chambers having a rectangular free throughflow cross section solely delimited by peripheral duct walls in a direction transverse to the liquid throughflow direction, the duct walls having a duct wall thickness;
   at least two layers of individual fin rows of meandering fins extending between each adjacent pair of the ducts, being capable of a throughflow of air jointly and delimiting a second flow chamber, each of the fins having a fin height at least as large as the free throughflow cross section of the flow chambers of the ducts arranged adjacent thereto and having a fin wall thickness equal to the duct wall thickness, each of the fin rows having the fins being arranged in succession and being offset from each other in the liquid throughflow direction in parallel in each of the layers;
   two media-conveying main struts, the ducts and the fin rows of the fins extending between the main struts and spanning a rectangular front cooler surface, the flow chambers of the ducts being connected in fluid communication with interiors of the main struts; and
   a partition wall separating the two layers, the partition wall and the two layers and extending in horizontal planes.

2. The cooler according to claim 1 wherein the cooler surface includes 25 to 63 of the ducts.

3. The cooler according to claim 2 wherein the cooler surface includes 54 of the ducts.

4. The cooler according to claim 1 wherein at least parts of the fins adjoining one another in each of the fin rows of each of the layers extend in a bar-shaped manner forming a waveform between two respective opposite deflection points, the deflection points being congruently facing each other in joint planes adjoining the ducts adjacent thereto.

5. The cooler according to claim 1 wherein the partition wall extends in parallel to the liquid throughflow direction of the liquid medium in the ducts.

6. The cooler according to claim 1 wherein the partition wall has a partition wall thickness equal to the fin wall thickness.

7. The cooler according to claim 1 wherein the fin height is three to six times the free throughflow cross section of the flow chambers of the ducts.

8. The cooler according to claim 1 wherein the fin height is five times the free throughflow cross section of the flow chambers of the ducts.

9. The cooler according to claim 1 wherein the fins in each of the fin rows are offset such that each of the fins in one of the fin rows of the fins arranged between two other of the fin rows of the fins are parallel to each other and form offset-free fin rows with the fins extending offset from adjacent ones of the fins of two adjacent fin rows by predeterminable axial distances parallel to the ducts in liquid throughflow direction.

10. The cooler according to claim 1 wherein the fins are offset by 3 mm to 8 mm.

11. The cooler according to claim 1 wherein the fins are offset by 4 mm to 6 mm.

12. The cooler according to claim 1 wherein the fins are offset by 5 mm to 5.9 mm.

13. The cooler according to claim 1 wherein the fin height in the direction transverse to the liquid throughflow direction is between 5 mm to 15 mm; and a total depth of the cooler elements having a plurality of fin rows arranged in succession is 60 mm to 90 mm, in depth.

14. The cooler according to claim 13 whereon the fin height in the direction transverse to the liquid throughflow direction is 12 mm.

15. The cooler according to claim 13 whereon a total depth of the cooler elements having a plurality of fin rows arranged in succession is 63 mm and 82 mm in depth.

16. The cooler according to claim 1 wherein the fins are formed from a sheet material; the fin wall thickness is 0.15 mm to 0.4 mm; and the partition wall is formed of sheet material and has a partition wall thickness between the fin rows of 0.2 mm to 0.8 mm.

17. The cooler according to claim 16 wherein the fin wall thickness is 0.2 mm; and the partition wall thickness between the fin rows is 0.4 mm.

18. The cooler according to claim 1 wherein the fins are bar-shaped, two adjacent ones of the fins in the fin rows being integrally interconnected via connecting bars extending in parallel to the liquid throughflow direction.

19. A wind turbine, comprising:
   a nacelle of a turbine; and
   a cooler without any fan drive and capable of operation by only blade air flow and purely wind-driven ambient air or by only blade air flow or only by purely wind-driven ambient air, the cooler being mounted on the nacelle and including
      individual cooling elements of stacked construction having ducts extending in parallel to one another, each of the ducts delimiting a flow chamber being capable of a first throughflow of a liquid medium to be cooled and being free of obstacles permitting a laminar flow of the liquid medium through each of the ducts in a liquid throughflow direction, each of the flow chambers having a rectangular free throughflow cross section solely delimited by peripheral duct walls in a direction transverse to the liquid throughflow direction, the duct walls having a duct wall thickness;

at least two layers of individual fin rows of meandering fins extending between each adjacent pair of the ducts, being capable of a throughflow of air jointly and delimiting a second flow chamber, each of the fins having a fin height at least as large as the free throughflow cross section of the flow chambers of the ducts arranged adjacent thereto and having a fin wall thickness equal to the duct wall thickness, each of the fin rows having the fins being arranged in succession and being offset from each other in the liquid throughflow direction in parallel in each of the layers;

two media-conveying main struts, the ducts and the fin rows of the fins extending between the main struts and spanning a rectangular front cooler surface, the flow chambers of the ducts being connected in fluid communication with interiors of the main struts; and a partition wall separating the two layers, the partition wall and the two layers and extending in horizontal planes.

20. The wind turbine according to claim 19 wherein at least parts of the fins adjoining one another in each of the fin rows of each of the layers extend in a bar-shaped manner forming a waveform between two respective opposite deflection points, the deflection points of the two layers being congruently facing each other in joint planes adjoining the ducts adjacent thereto.

\* \* \* \* \*